US009049330B2

(12) United States Patent
Coles et al.

(10) Patent No.: US 9,049,330 B2
(45) Date of Patent: Jun. 2, 2015

(54) DEVICE CONFIGURED TO MANAGE SECURE INGESTION OF DOCUMENTS INTO AN INFORMATION SYSTEM, AND METHODS FOR OPERATING SUCH A DEVICE

(71) Applicant: Berkeley Information Technology Pty Ltd, Sydney (AU)

(72) Inventors: Scott David Coles, Waverton (AU); Mark Peter Naglost, Pyrmont (AU); Philip James Hawthorne, Glengarry (AU)

(73) Assignee: Berkeley Information Technology PTY LTD, Sydney, New South Wales (AU)

( * ) Notice: Subject to any disclaimer, the term of this patent is extended or adjusted under 35 U.S.C. 154(b) by 23 days.

(21) Appl. No.: 13/967,066

(22) Filed: Aug. 14, 2013

(65) Prior Publication Data

US 2014/0049801 A1 Feb. 20, 2014

(30) Foreign Application Priority Data

Aug. 16, 2012 (AU) ................................ 2012903532

(51) Int. Cl.

| | |
|---|---|
| ***G06K 15/00*** | (2006.01) |
| ***G06F 3/12*** | (2006.01) |
| ***H04N 1/00*** | (2006.01) |
| ***G06F 21/62*** | (2013.01) |
| ***H04N 1/32*** | (2006.01) |

(52) U.S. Cl.

CPC .... *H04N 1/00864* (2013.01); *H04N 2201/3246* (2013.01); *G06F 21/6272* (2013.01); *H04N 1/32101* (2013.01)

(58) Field of Classification Search

None

See application file for complete search history.

(56) References Cited

U.S. PATENT DOCUMENTS

| | | | | |
|---|---|---|---|---|
| 8,532,384 | B2 * | 9/2013 | Howie | 382/176 |
| 8,532,978 | B1 * | 9/2013 | Turner | 704/9 |
| 2002/0194194 | A1 * | 12/2002 | Fenton et al. | 707/104.1 |
| 2006/0031094 | A1 * | 2/2006 | Cohen et al. | 705/2 |
| 2006/0156219 | A1 * | 7/2006 | Haot et al. | 715/500.1 |
| 2006/0206462 | A1 | 9/2006 | Barber | |
| 2006/0259983 | A1 | 11/2006 | Sperry | |
| 2007/0220575 | A1 * | 9/2007 | Cooper et al. | 725/118 |

(Continued)

OTHER PUBLICATIONS

International Search Report, mailed Oct. 8, 2013, for PCT/AU2013/000902, 4 pages.

(Continued)

*Primary Examiner* — Madelein Nguyen
(74) *Attorney, Agent, or Firm* — Seed IP Law Group PLLC

(57) ABSTRACT

Described herein are systems and methods for managing electronic documents. In particular, embodiments of the present invention are focussed on managing ingestion of documents into an information system, such as ingestion of documents generated by a device having scanning functionality. Embodiments include devices, software (defined by computer executable code), carrier media, and methodologies. In overview, a document is received from an ingestion source, such as a Multi Function Device (MFD) having a scanner. For example, the document is a scanned into an electronic form from a paper form. This electronic form is subjected to additional processing thereby to implement a predefined security protocol prior to the document (or a modified version thereof) being released into an information system.

28 Claims, 9 Drawing Sheets

(56) References Cited

U.S. PATENT DOCUMENTS

| | | | | |
|---|---|---|---|---|
| 2007/0286420 | A1* | 12/2007 | MacLean et al. | 380/201 |
| 2008/0263363 | A1* | 10/2008 | Jueneman et al. | 713/184 |
| 2010/0021027 | A1* | 1/2010 | Hartkens et al. | 382/128 |
| 2010/0046553 | A1* | 2/2010 | Daigle et al. | 370/474 |
| 2010/0061634 | A1* | 3/2010 | Howie | 382/176 |
| 2010/0070753 | A1* | 3/2010 | Kido et al. | 713/150 |
| 2010/0260468 | A1* | 10/2010 | Khatib et al. | 386/52 |
| 2011/0173445 | A1 | 7/2011 | Yami et al. | |
| 2012/0323717 | A1* | 12/2012 | Kirsch | 705/26.1 |
| 2013/0019295 | A1* | 1/2013 | Park et al. | 726/7 |
| 2013/0039570 | A1* | 2/2013 | Vincent et al. | 382/159 |
| 2013/0074185 | A1* | 3/2013 | McDougal et al. | 726/24 |
| 2013/0151300 | A1* | 6/2013 | Le Chevalier et al. | 705/7.15 |
| 2013/0179244 | A1* | 7/2013 | Laffoon et al. | 705/14.23 |
| 2013/0262333 | A1* | 10/2013 | Wicker et al. | 705/325 |
| 2013/0304655 | A1* | 11/2013 | Johnston et al. | 705/307 |
| 2014/0053231 | A1 | 2/2014 | Coles et al. | |
| 2014/0053232 | A1 | 2/2014 | Coles et al. | |
| 2014/0068400 | A1* | 3/2014 | Gulezian et al. | 715/202 |
| 2014/0129457 | A1* | 5/2014 | Peeler | 705/317 |
| 2014/0156064 | A1* | 6/2014 | Crawford et al. | 700/236 |

OTHER PUBLICATIONS

Written Opinion, mailed Oct. 8, 2013, for PCT/AU2013/000902, 4 pages.

* cited by examiner

DEVICE CONFIGURED TO MANAGE SECURE INGESTION OF DOCUMENTS INTO AN INFORMATION SYSTEM, AND METHODS FOR OPERATING SUCH A DEVICE

FIELD OF THE INVENTION

The present invention relates to a device configured to manage secure ingestion of documents into an information system, and methods for operating such a device (for example computer implemented methods performed by execution of computer readable code). Embodiments of the invention have been particularly developed thereby to provide a secure filter between an ingestion source, such as a scanner or multifunction device, and an information system, thereby to selectively enable or prevent documents from being ingested (e.g. saved in electronic form) within the information system. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

The ability to quickly and easily create electronic copies of a document, for example using a scanner or other such device, creates a substantial cause for concern in environments where confidential and otherwise sensitive information is handled. Although a great deal of document security technology has been developed to deal with problems associated with maintaining security of documents within an information system, once such documents are printed (or otherwise exported beyond the control of such document security technology) it becomes very difficult to manage risks associated with unauthorised duplication and the like.

SUMMARY OF THE INVENTION

It is an object of the present invention to overcome or ameliorate at least one of the disadvantages of the prior art, or to provide a useful alternative.

One embodiment provides a computer implemented method for managing ingestion of documents into an information system, the method including:

receiving, from an ingestion source, via an input coupled to the ingestion source, data indicative of a document;

storing the document in a memory location isolated from the information system;

processing the document based on a predefined security protocol thereby to determine an ingestion procedure for the document;

executing the ingestion procedure; and subject to the execution of the ingestion procedure, selectively releasing a modified version of the document to the information system.

One embodiment provides a method wherein processing the document based on a predefined security protocol includes performing OCR analysis.

One embodiment provides a method wherein processing the document based on a predefined security protocol includes determining whether the document contains one or more alert artefacts.

One embodiment provides a method wherein the one or more alert artefacts include one or more keywords or phrases defined in a list of alert keywords and/or phrases.

One embodiment provides a method wherein the one or more alert artefacts include non-textual artefacts.

One embodiment provides a method wherein determined ingestion procedure includes a set of steps, wherein one or more of those steps are selected based on the determination of presence of alert artefacts in the document.

One embodiment provides a method wherein, based on the determination of presence of alert artefacts in the document, the ingestion procedure prevents release of any version of the document to the information system.

One embodiment provides a method wherein the ingestion procedure includes associating one or more aspects of metadata with the document, thereby to at least in part define the modified version of the document.

One embodiment provides a method wherein associating one or more of the aspects of metadata are defined subject to user input.

One embodiment provides a method wherein the ingestion procedure includes delivering a user interface configured to obtain the user input.

One embodiment provides a method wherein the one or more aspects of metadata include any one or more of: biometric data, ingestion details, user data, security classification data, and content-based classification data.

One embodiment provides a method wherein the ingestion procedure includes inserting additional visible content into the document thereby at least in part define the modified version of the document.

One embodiment provides a method wherein the ingestion source includes a device having a document scanning functionality.

One embodiment provides a method where the method is performed at a device distinct from the ingestion source.

One embodiment provides a method wherein the method is performed by a device that includes the ingestion source.

One embodiment provides a device including:

an input configured to couple the device to a distinct device including an ingestion source;

an output configured to enable release of a document to an information system;

a processor;

a memory module containing computer executable code that, when executed via the processor, configured the device to perform a method as described herein.

One embodiment provides a device including:

an ingestion source;

an output configured to enable release of a document to an information system;

a processor;

a memory module containing computer executable code that, when executed via the processor, configured the device to perform a method as described herein.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing electronic documents. In particular, embodiments of the present invention are focussed on managing ingestion of documents into an information system, such as ingestion of documents generated by a device having scanning functionality. Embodiments include devices, software (defined by computer executable code), carrier media, and methodologies. In overview, a document is received from an ingestion source, such as a Multi Function Device (MFD) having a scanner. For example, the document is a scanned into an electronic form from a paper form. This electronic form is subjected to additional processing thereby to implement a predefined security protocol prior to the document (or a modified version thereof) being released into an information system.

As used herein, the term "ingestion" refers to a process whereby a document is received from source (for example an ingestion source that converts a hard copy document into an electronic document, or a flash drive containing documents), and is saved into storage within an information system. The technologies and methodologies described herein relate to procedures that occur during "ingestion", i.e. between receipt of the document from an ingestion source and release of the document (or a modified version thereof) into the information system.

Methodology Overview

Figure 1:
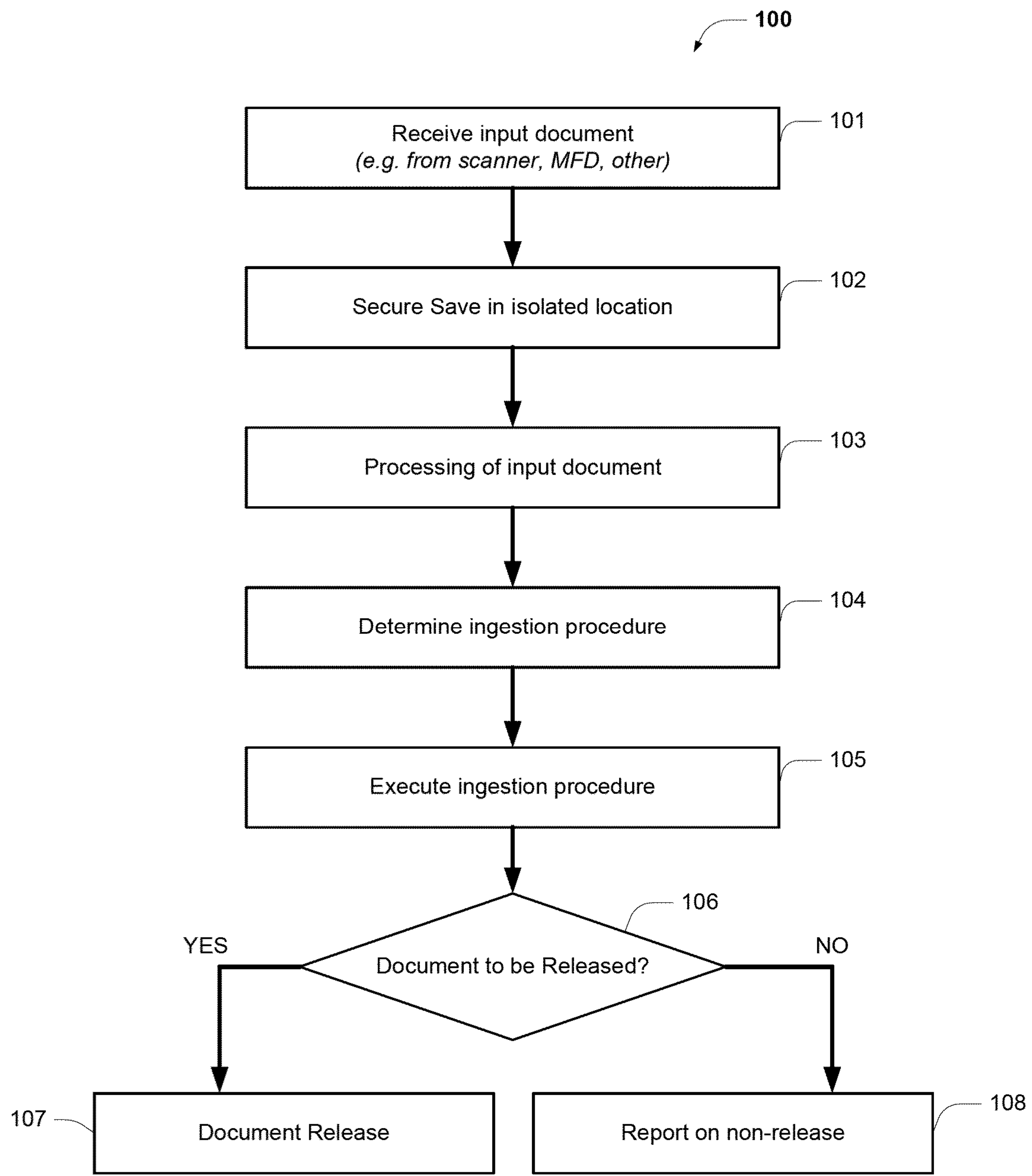
FIG. 1 illustrates a method according to one embodiment.

FIG. 1 illustrates a method 100 according to one embodiment which provides an overview of a methodology leveraged by various embodiments discussed herein. This methodology is optionally performed by a computing device by the execution of computer executable code via one or more microprocessors of the computing device. In this regard, the term "computing device" describes substantially any machine capable of executing computer-readable code, such as tablet devices, image processing devices, computers, handheld devices, smartphones, and so on.

Functional block 101 represents process including receiving data indicative of an input document from an ingestion source. The ingestion source may be integrated with the computing device that performs method 100 (for example method 100 is performed by a MFD), or provided by a distinct device (for example where method 100 is performed by a computing device coupled to a MFD). The term "ingestion source" as used herein should be afforded a broad interpretation, including substantially any component capable of providing an electronic document. Particular attention is given to ingestion source in the form of "document scanners", with this term being used to describe any device or component that is configured to define an electronic document from a hard-copy document.

In overview, a user operates an ingestion source, thereby to commence ingestion of a document into a desired information system. So as to provide a simple practical example, a user may operate a MFD thereby to scan a hard copy document, with the hard copy document to be delivered to a computer network associated with the MFD.

Following the completion of processes described by functional block 101, data indicative of an ingested input document is available. Functional block 102 represents a process including performing a "secure save" of the input document. This includes storing the input document in a memory location isolated from an information source. The secure save includes storing digital information defining the input document on a secure storage device. The memory location is isolated from the information system in the sense that a user of another device coupled to the information system is unable to identify or otherwise access the securely saved version of the input document. For example, in one embodiment method 100 is performed on a tablet device (or other computing device) interposed between a device that provides the ingestion source and the information system (i.e. networked devices on the information system). A firewall (or similar technological means) is optionally used thereby to permit only one-way communication between the tablet device and the information system. That is, the tablet device is enabled to communicate (e.g. deliver files) to the information system, but devices on the information system are unable to communicate with the target device. For example, the tablet device is invisible to the information system (i.e. invisible to any networked devices of the information system). In this manner, the target device is able to provide a form of secure filter between an ingestion source, such as a scanner or multifunction device, and an information system, thereby to selectively enable or prevent documents from being ingested (e.g. saved in electronic form) within the information system.

Functional block 103 represents a process including processing the input document based on a predefined security protocol. For example, the processing may include conducting analysis of the document graphical content (for example via OCR and other means). This is optionally used to determine whether the document contains one or more "alert artefacts". For example, for the or each form of graphical content analysis (with OCR being one example), a set of alert artefacts are defined, and the analysis identifies presence and/or count of such alert artefacts. In the example of OCR, the alert artefacts are preferably keywords and/or phrases. A list of such keywords and/or phrases is defined for the predefined security protocol, this list preferably being customized (or customisable on an ongoing basis) for a given set of customer needs. This is discussed in more detail below.

Although the present disclosure focuses on the specific example of OCR analysis, it will be appreciated that other forms of document graphical content analysis may be performed, these being directed to identification of graphical artefacts that are character/text based and optionally non-character/text based (for example logos, barcodes, encoded identification images, and so on).

Based on the processing at 103, an ingestion procedure is determined at 104 for the input document. The term "ingestion procedure" describes a set of steps that are performed prior to release (or denial of release) of the document into the information system. In overview, an ingestion procedure may include one or more of the following categories of steps:

- Association of metadata with the input file (for example based on ingestion time, user data, document content indicators, user input, classification data, and so on).
- Insertion of additional graphical content into the input file (for example watermarks, caveats, sensitivity indicators, releasability information, handling instructions, compartments, and so on).
- Providing user interface components for the collection of user input data (such as alphanumeric input data and biometric input data).
- Procurement of user data (for example security credentials). This may be defined for a given implementation based on desired security procedures (for example a requirement that each ingestion operation be authorised by two separate users, or the like).
- Preventing release and deleting the secure save.

In some embodiments functional block 103 is omitted, and a default ingestion procedure applied to all documents. Additional disclosure concerning ingestion procedures is provided further below.

Functional block 105 represents a process including executing the ingestion procedure. Subject to completion of the ingestion procedure, a modified version of the input document is selectively released into the information system. This is a "modified version" in the sense that metadata and other content is inserted into/associated with the input document during the ingestion procedure. The document is "selectively released" in the sense that, at least in some embodiments, upon completion (or failed completion) of the ingestion procedure, there is either a command to release the document, or a command to prevent the document from being released (in which case the securely saved document is preferably purged).

Decision block 105 represents a process whereby, subject to the execution of the ingestion procedure (and optionally subject to additional criteria), the document is either released at 107, or not released (in which cases a non-release report is generated at 108).

Where a document is released, that release is preferably performed in a manner defined by a set of release rules defined for the information system, optionally in combination with user instructions and/or based on constraints defined during the ingestion process (for example allowing release to one networked storage location but not others).

In the case of non-release, a report may optionally be generated and delivered to a predetermined party. This report may include details as to the reason for non-release, including details of the user. In some embodiments a copy of the document is retained in the secure save location for review by a higher-level user. In some embodiments additional steps are taken in the case of non-release, including the likes of raising of alarms and/or coordinating actions within an access control system (for example a lockdown of an area of a building including the ingestion source).

Exemplary Standalone Device

Figure 2A:
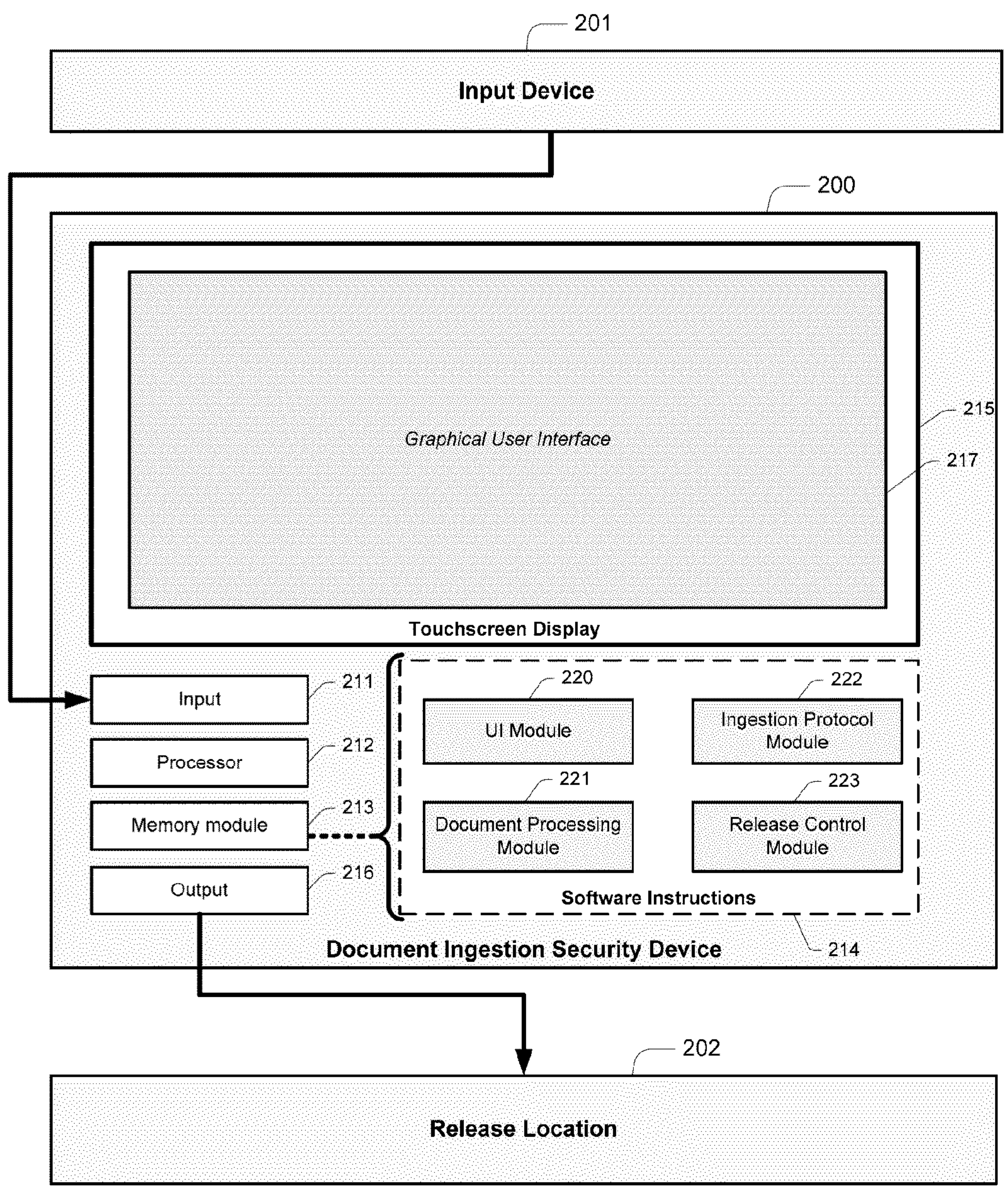
FIG. 2A illustrates a system according to one embodiment.

FIG. 2A illustrates an exemplary framework including a document ingestion security device 100 according to one embodiment. Device 200 is configured to manage secure ingestion of documents from an input device 201 into a release location 202. In this example, device 200 is a touch-screen-enabled tablet-style device. However, it will be appreciated that other forms of device are used in further embodiments. Furthermore, it will be appreciated that, although the example of FIG. 2A illustrates only a single input device and a single release location, in some embodiments there are multiple input devices and/or multiple release locations.

Device 200 includes an input 211 which enables communication between input device 201 and device 200. For example, input 211 may include a serial interface, USB interface, network interface, or the like. The nature of input device 200 is generally dependent on the nature of input device 201 (and more particularly the manner by which input device 201 provides downstream data indicative of input documents).

Device 200 includes a processor 212 coupled to a memory module 213. This Memory module 213 contains software instructions 214 that, when executed via processor 212, enables device 200 to perform a method such as method 100 of FIG. 1 (or a variation thereof). Execution of this method includes displaying a graphical user interface 217 on a touch-screen display 215, thereby to enable the delivery of information to a user, and the collection on information from a user. In some cases additional user inputs (such as biometric devices, cameras, buttons, and the like) are provided thereby to collect additional information from a user.

Device 200 additionally includes an output 216, which is coupled to release location 202. Again, the nature of output 216 varies between embodiments, depending on the manner by which release location 202 is configured to receive document data. In some embodiments, input 211 and output 216 are selected such that device 200 is serially interposed intermediate input device 201 and release location 202, to act as a serial filter on downstream data being communicated between input device 201 and release location 202.

Software instructions 214 are illustrated by reference to a set of "modules" which describe functionally distinguishable software components. These include:

A user interface (UI) module 220, which is configured to provide graphical user interface 217, and receive user input.

A document processing module 221 configured to perform one or more document processing steps (such as OCR and other graphical analysis, extraction of existing meta-data, and so on).

An ingestion protocol module 222 configured to determine an ingestion procedure for the document based on a set of ingestion rules, and based on input from document processing module 221, executing the determined ingestion procedure (which in some embodiments include providing instructions to UI module 220 thereby to enable collection of data required for the ingestion procedure).

A release control module 224 which is responsive to instructions from the ingestion procedure module 222 and to a set of document release rules for selectively releasing a modified version of the input document to release location 202.

Additional disclosure concerning exemplary ingestion rules and release rules is provided further below.

Exemplary Integrated Device

Figure 2B:
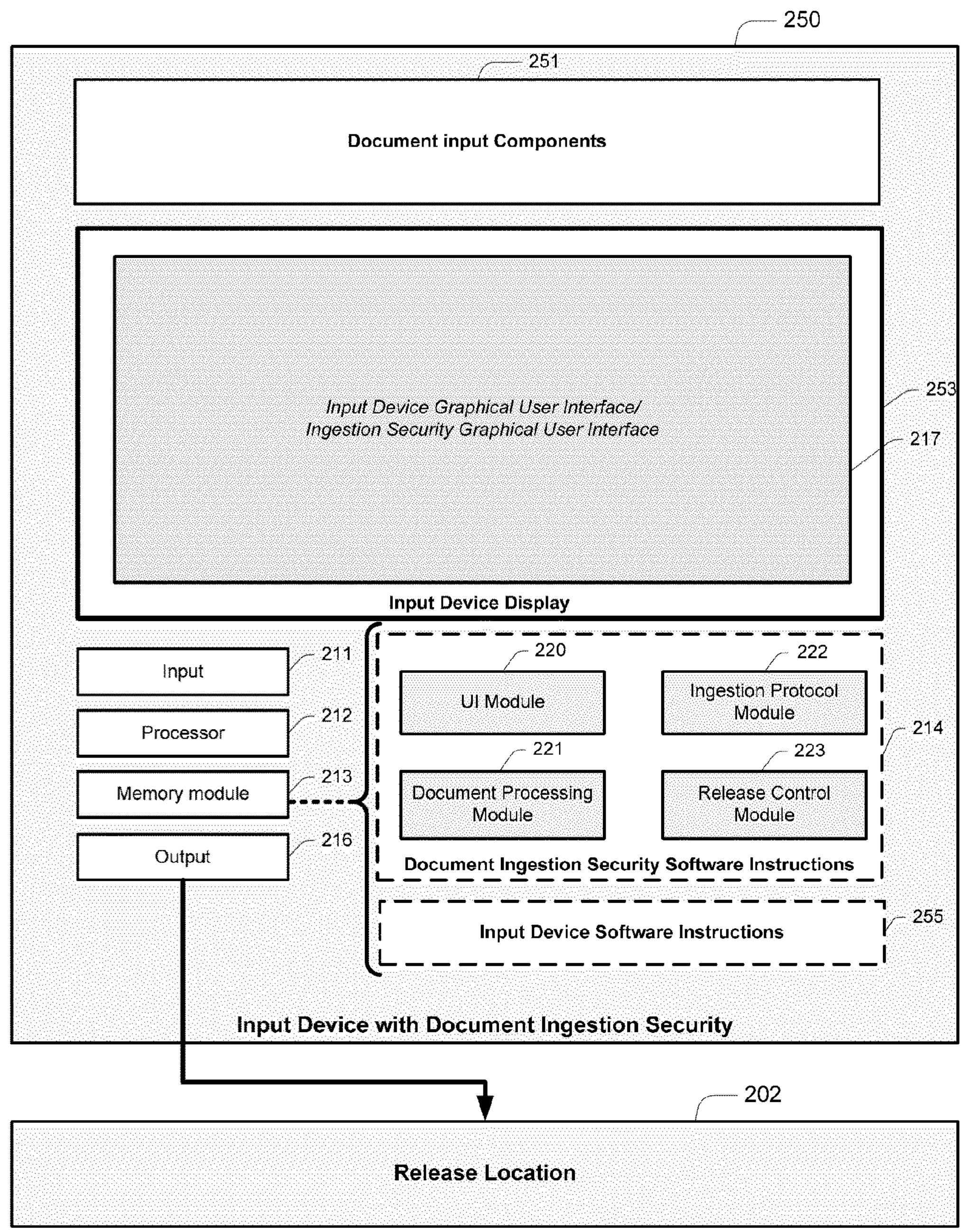
FIG. 2B illustrates a system according to one embodiment.

FIG. 2B illustrates an exemplary framework including an input device 250 with integrated document ingestion security. This may be either an input device pre-configured to provide document ingestion security, or an input device that is modified (for example by way of software modifications) thereby to provide document ingestion security.

Device 250 includes document input components (for example hardware components associated with document scanning and the like) and input device software instructions 255, which enable device 250 to perform input device specific functionalities. An input device display 253 is configured to provide a GUI 254 for both document input functionalities, and for document ingestion functionalities. Otherwise, it will be appreciated that device 250 includes comments corresponding to comments shown in FIG. 2A, labelled by corresponding reference numerals.

In a further embodiment, document ingestion security is embedded in a personal computer associated with a network corresponding to release location 202. In such embodiments software instructions 214 provide additional functionality thereby to prevent documents from an input source from reaching a conventional memory location prior to application of an ingestion process. For example, software instructions 214 define a secure storage location (or otherwise secured storage approach) using hardware associated with the personal computer.

Exemplary Ingestion Rules

As noted above, an ingestion procedure is determined for an input document based on the application of a set of ingestion rules, and based on input from document processing. Ingestion rules may include any one or more of the following:

A rule specifying one or more steps that are to be performed for all input documents. For example, collection of user data may be required for all documents.

A rule specifying one or more steps that are to be performed if a given document artefact is identified, or in the case that results of identification of document artefacts satisfy predefined characteristics. For example, particular steps may be required in the case that a keyword such as "confidential" is identified.

A rule specifying that one or more steps are to be performed based on processing of user data. For example, required steps may vary depending on a level of security clearance associated with a user.

In some embodiments rules are customisable as part of a configuration process. In this manner, document ingestion is able to be specifically configured for a given implementation, taking into consideration factors such as sensitive keyword.

Exemplary Release Rules

As noted above, a document is selectively released responsive to instructions stemming from an ingestion procedure module and to a set of document release rules. Document release rules may include any one or more of the following:

In the case that, based on the ingestion procedure, a document is classified to a given security level, a requirement that a user having at least that security level authorise the release. This, for example, prevents a user scanning documents that are deemed to be above their own security clearance.

In the case that, based on the ingestion procedure, a document is classified to a given security level, a requirement that the document be released only to storage locations associated with at least that security level.

It will be appreciated that other release rules may be present in further embodiments.

In some embodiments release rules may require that a given document be approved by multiple users prior to ingestion (for example by the user coordinating ingestion and a further user having predefined security clearance or the like). In some embodiments this is managed without requiring the multiple users each interact with a device such as 200 or 250. Rather, in some embodiments, in response to release rules, an electronic message is sent to a predefined user (or users) from whom approval is required prior to release. Whilst pending such approval, the document remains "uningested" (for example in memory of a device 200 or 250). The message may optionally include data indicative of the document, optionally in a redacted form.

In some embodiments additional actions are performed in the event that a document is not released, for example by generating reports regarding the content of such documents, users responsible for inputting the documents, and reasons for refusal.

Automated Redaction of Documents

Some embodiments provide methods for automated redaction of documents. For example, in some embodiments device 200 is configured to perform automated redaction methods described herein as part of an ingestion procedure, or as a standalone function.

In overview, an automated redaction method includes receiving, from an ingestion source, via an input coupled to the ingestion source, data indicative of a document. That document is then processed based on a predefined security protocol thereby to identify one or more alert artefacts in the document, based on a predefined set of alert artefacts. As noted above, alert artefacts may include textual (e.g. OCR detected) or non-textual artefacts. Based at least in part upon the identified one or more alert artefacts (and optionally based on other factors, such as user security level, user input, and so on), a first "native" security level is determined for the document.

Once the native security level is determined, the document is processed thereby to redact one or more portions based on locations of one or more of the identified alert artefacts, thereby to define a modified version of the document having a second security level lesser than the first security level (referred to as a "reduced" security level). The manner by which portions are identified varies between embodiments. For example one approach includes identification of logical document portions (for example paragraphs, lines, sentences, etc) based on textually or graphically identifiable delimiters. Rules are defined for keywords, such that a portion is redacted (e.g. deleted to covered by a mask) based on a rule each time a keyword is identified. For example:

One rule might redact any consecutive characters following a "$" sign.

One rule might redact any paragraph following a line containing the word "confidential".

One rule might redact any paragraph containing a product name.

It will be appreciated that rules are conveniently able to be defined for any given implementation environment during a system pre-configuration process, or during ongoing configuration and/or maintenance.

In some cases only a single reduced security level version is defined. For example, in some embodiments the method includes determining a security level of a user, and selecting the reduced security level based on the security level of the user. However, in further embodiments the method includes define multiple reduced security level versions of the document having respective unique security levels. In some cases all of these are released into an information system. In other cases user interface 217 enables a user to select which are desired. In some cases a non-redacted version is released at a security level which exceeds that of the user (the user is not, however, able to access that document). In some cases the multiple versions are released to respective locations in the information system based on their respective security levels.

Some embodiments enable a user to preview the version of the document having the second security level prior to release into the information system (for instance via user interface 217). This may include enabling the user to remove and/or add redactions in the preview of the modified version. In such cases, in the event that the user removes and/or adds redactions in the preview of the modified version, there is a re-determining of a security level for the user-redacted document.

This form of automated redaction may be applied thereby to provide a form of email filtering (for example in respect of incoming, outgoing and/or internal emails, and/or at a boundary of a file system used to store emails). For example, outgoing emails are processed based on the automated redaction method prior to being delivered to their intended recipients, and a redacted version presented to the sender for approval. This may be useful in terms of limiting communication regarding various topics via email, and/or controlling communication regarding sensitive topics (optionally responsive to security clearance levels of the sender and/or recipient). For example, in one embodiment each outgoing email is treated as originating at an ingestion source, is processed for automated redaction as described above (with a proposed redacted version optionally being returned to the sender for approval), prior to being released for ingestion by way of delivery through the local mail server to an intended recipient.

Exemplary Methods

FIG. 3A to FIG. 3F illustrate exemplary document ingestion methods according to various embodiments. In some cases the methods include similar steps designated by corresponding reference numerals. It will be appreciated that these methods are performable by a device, such as device 200, by execution of computer executable code.

Figure 3A:
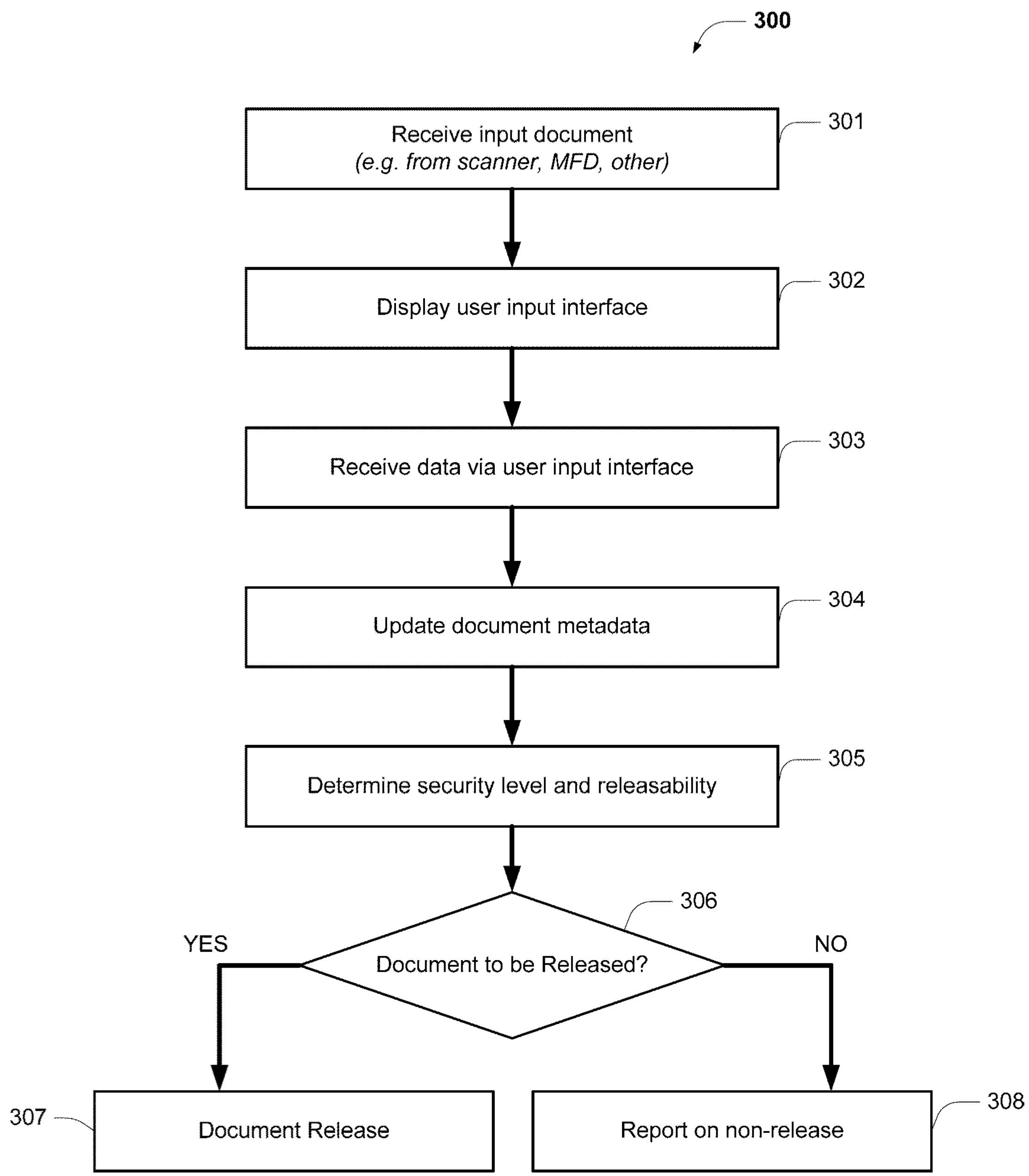
FIG. 3A illustrates a method according to one embodiment.

In method 300 of FIG. 3A, an input document is received at 301. A user interface is displayed at 302, which instructs a user to provide various aspects of information (for example credentials, document explanation, responses to questions, and so on). Responses are received at 303. Document metadata is then updated at 304, and determinations made as to security level and releasability made at 305. Based on decision 306, the document is either released at 307, or not released and a report on non-release generated at 308.

Figure 3B:
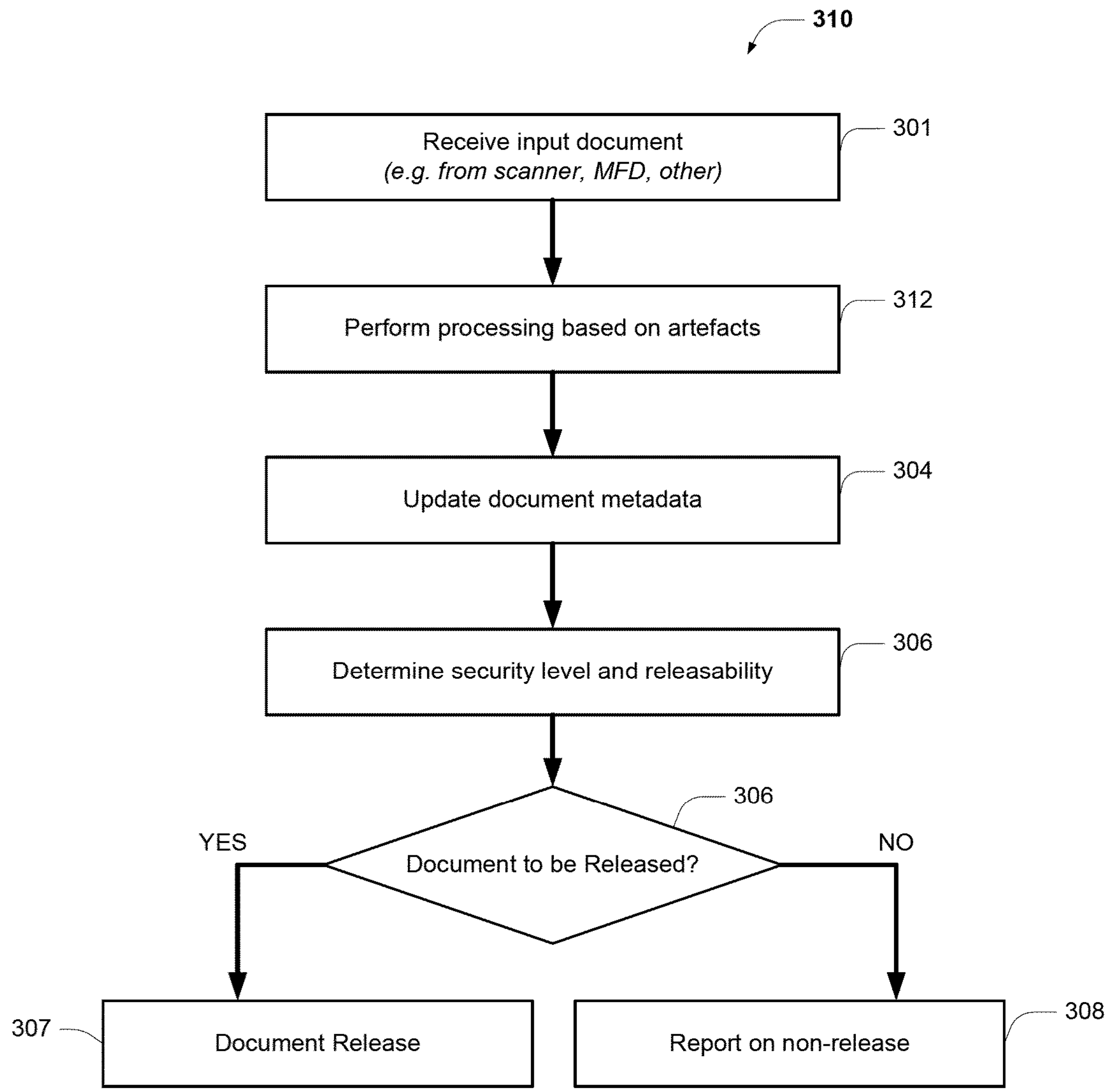
FIG. 3B illustrates a method according to one embodiment.

In method 310 of FIG. 3B, an input document is received at 301. That document is processed at 312 based on identification of artefacts, and document metadata updated at 304. Determinations are made as to security level and releasability made at 305. Based on decision 306, the document is either released at 307, or not released and a report on non-release generated at 308.

Figure 3C:
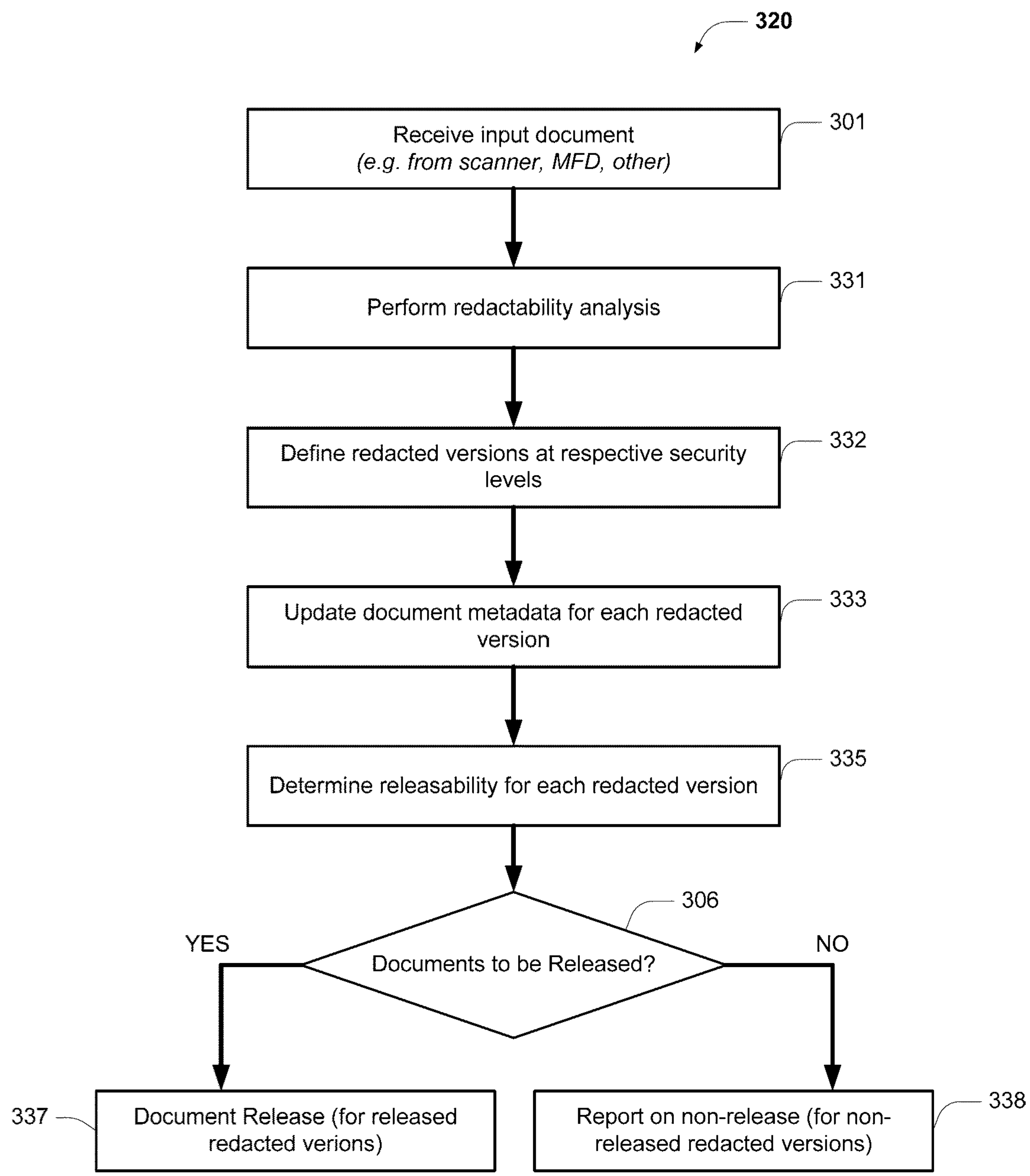
FIG. 3C illustrates a method according to one embodiment.

In method 320 of FIG. 3C, an input document is received at 301. Redactability analysis is performed at 331. This may include processing based on artefacts (and or other means), determination of a security level, and then determination as to whether redaction to remove artefacts and surrounding data would result in decreased security level. Based on that analysis, one or more redacted versions are defined at 332, and document metadata updated for each redacted version at 333. Determinations are made as to security level and releasability made at 335 for each version. Based on decision 306, the documents are each either released at 337, or not released and a report on non-release generated at 338 (noting that the method may involve both of these steps, but only one of the two for each individual redacted version).

Figure 3D:
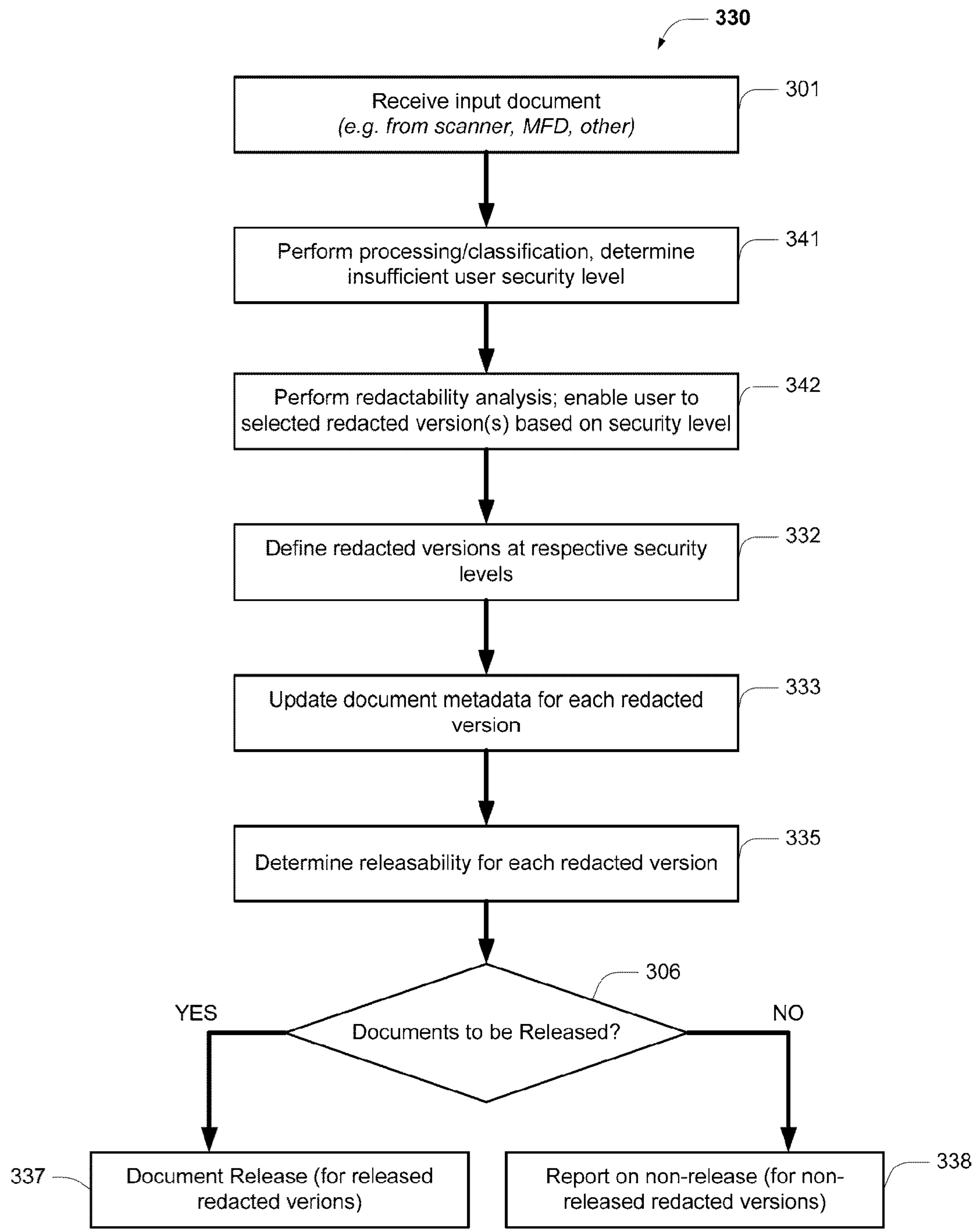
FIG. 3D illustrates a method according to one embodiment.

In method 330 of FIG. 3D, an input document is received at 301. Processing/classification is performed at 341 (for example using various methodologies described further above), resulting in a determination that the current user does not have an adequate security level for release of the relevant document. Redactability analysis is performed at 342, enabling the user to select one or more redacted versions of the document at a security level held by the user. The method then continues with steps 332 to 338 as described by reference to FIG. 3C.

Figure 3E:
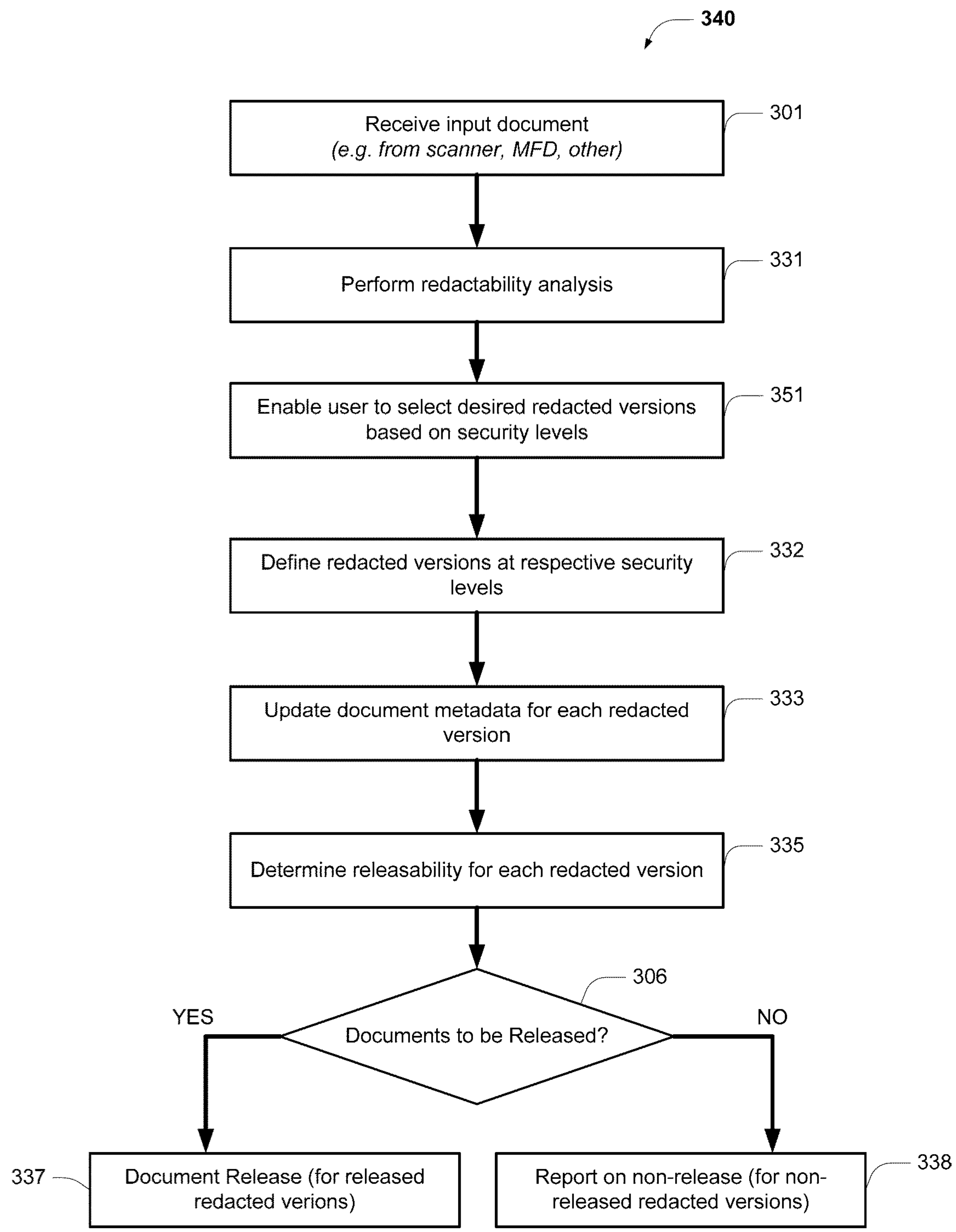
FIG. 3E illustrates a method according to one embodiment.

In method 340 of FIG. 3E, an input document is received at 301. Redact ability analysis is performed at 331, and a user is enabled at 351 to select security levels at which redacted versions of the document are desired. Redacted versions for those levels are then defined at 332, and the method continues with steps 333 to 338.

Figure 3F:
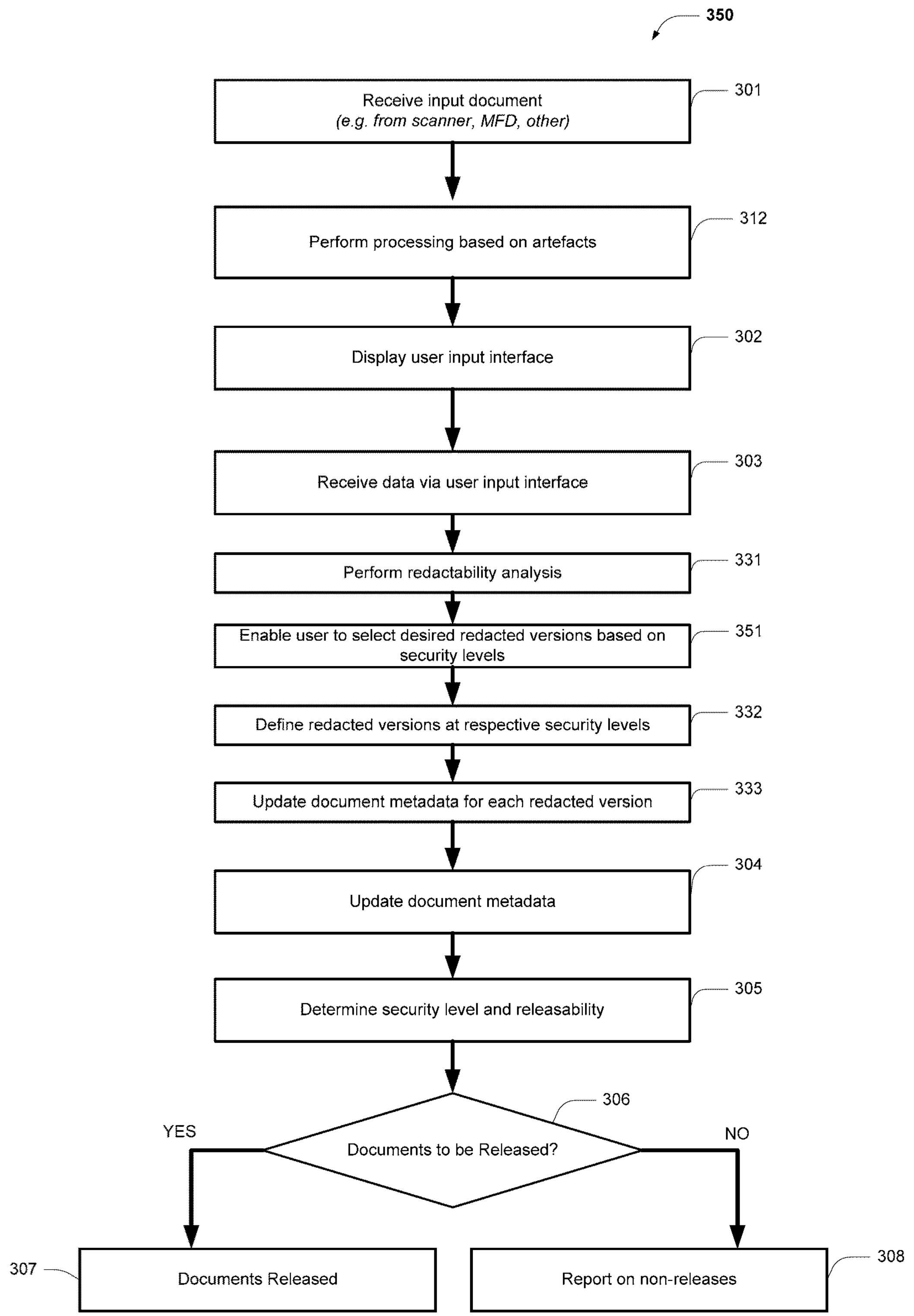
FIG. 3F illustrates a method according to one embodiment.

Method 350 of FIG. 3F includes a combination of steps described by reference to previous methods, including aspects of artefact-based processing, user-input procurement, and reaction. It will be appreciated that this is one of many possible examples for defining more complex methods from the steps described herein.

Ingestion-triggered Document Tracking

In some embodiments, a document tracking system is configured based upon document ingestion. For example, document rules are able to be configured thereby to monitor access (or attempted access) to ingested documents based on, for example, user preferences (i.e. a user manually defines rules for a given document), or based on predefined rules (e.g. based upon identification of alert artefacts).

Document tracking rules may be configured by way of a user interface which enables selection of criteria (for example based upon user security level, alert artefacts, and the like) and response actions (for example to whom alerts are to be provide in the case that the selected criteria are met). This may be used for security purposes (for example to enable alerts whenever certain documents are accessed under certain conditions), or as a form of "read receipt" (so as to conveniently track when a set of desired users have all accessed a given document).

In this regard, one embodiment provides a computer implemented method for configuring document tracking for a document. The method includes receiving, from an ingestion source, via an input coupled to an ingestion source, data indicative of a document. The document is then analysed based on a set of tracking rules, wherein at least one tracking rule is defined by reference to an alert artefact that is identifiable in the document. The document is selectively released into a file system (for example based on other considerations disclosed herein). Based on a the tracking rules, a tracking module is configured to monitor access and/or attempted access to the document post-release, and provide predefined alert notifications in response to such access/attempted access. Preferably, a given tracking rule is defined by reference to:

(i) One or more attributes of the ingested document, such as responsible user, attributes of the responsible user, and ingestion artefacts;

(ii) One or more attributes of an accessing user; and (iii) One or more users to whom an alert is to be delivered.

In this way, a system can be configured to automatically track ingested documents (with or without knowledge of the ingesting user).

Conclusions and Interpretation

It will be appreciated that the disclosure above provides various significant systems and methods for managing document security.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for managing ingestion of documents into an information system, the method including:

receiving, from an ingestion source, via an input coupled to the ingestion source, data indicative of a document;

storing the document in a memory location isolated from the information system;

processing the document based on a predefined security protocol thereby to determine an ingestion procedure for the document;

executing the ingestion procedure;

subject to the execution of the ingestion procedure, selectively releasing a modified version of the document to the information system, and obtaining approval from a plurality of users prior to the document being released into the information system;

wherein obtaining approval from a plurality of users prior to the document being released into the information system includes:

(i) a first user, who is electronically authenticated based on authentication data uniquely associated with the first user, providing input representing approval by the first user; and (ii) a second user, who is electronically authenticated based on authentication data uniquely associated with the second user, providing input representing approval by the second user.

2. A method according to claim 1 wherein processing the document based on a predefined security protocol includes performing OCR analysis.

3. A method according to claim 1 wherein processing the document based on a predefined security protocol includes determining whether the document contains one or more alert artefacts.

4. A method according to claim 3 wherein the one or more alert artefacts include one or more keywords or phrases defined in a list of alert keywords and/or phrases.

5. A method according to 3 wherein the one or more alert artefacts include non-textual artefacts.

6. A method according to claim 3 wherein determined ingestion procedure includes a set of steps, wherein one or more of those steps are selected based on the determination of presence of alert artefacts in the document.

7. A method according to claim 3 wherein, based on the determination of presence of alert artefacts in the document, the ingestion procedure prevents release of any version of the document to the information system.

8. A method according to claim 1 wherein the ingestion procedure includes associating one or more aspects of metadata with the document, thereby to at least in part define the modified version of the document.

9. A method according to claim 8 wherein associating one or more of the aspects of metadata are defined subject to user input.

10. A method according to claim 9 wherein the ingestion procedure includes delivering a user interface configured to obtain the user input.

11. A method according to claim 8 wherein the one or more aspects of metadata include any one or more of: biometric data, ingestion details, user data, security classification data, and content-based classification data.

12. A method according to claim 1 wherein the ingestion procedure includes inserting additional visible content into the document thereby at least in part define the modified version of the document.

13. A method according to claim 1 wherein the ingestion source includes a device having a document scanning functionality.

14. A method according to claim 1 where the method is performed at a device distinct from the ingestion source.

15. A method according to claim 1 wherein the method is performed by a device that includes the ingestion source.

16. A method according to claim 1 wherein implementing the ingestion procedure includes configuring a tracking system based on a set of tracking rules such that alert notifications are generated based on the tracking rules in response to the document being accessed.

17. A method according to claim 1 wherein the ingestion source includes an email account, such that the method is performed in respect of an outgoing email.

18. A method according to claim 1 wherein the first user and the second user each provide their respective inputs representing approval via a single hardware device.

19. A method according to claim 1 wherein the first user provides the input representing approval by the first user via a first hardware device, wherein the method further includes providing an electronic message to the second user, wherein the second user receives the electronic message and provides the input representing approval by the second user via a second hardware device.

20. A method according to claim 19 wherein the electronic message includes data indicative of the document.

21. A device including:

an input configured to couple the device to a distinct device including an ingestion source;

an output configured to enable release of a document to an information system;

a processor;

a memory module containing computer executable code that, when executed via the processor, configured the device to perform a method including:

receiving, from an ingestion source, via an input coupled to the ingestion source, data indicative of a document;

storing the document in a memory location isolated from the information system;

processing the document based on a predefined security protocol thereby to determine an ingestion procedure for the document;

executing the ingestion procedure;

subject to the execution of the ingestion procedure, selectively releasing a modified version of the document to the information system; and obtaining approval from a plurality of users prior to the document being released into the information system;

wherein obtaining approval from a plurality of users prior to the document being released into the information system includes:

(i) a first user, who is electronically authenticated based on authentication data uniquely associated with the first user, providing input representing approval by the first user; and (ii) a second user, who is electronically authenticated based on authentication data uniquely associated with the second user, providing input representing approval by the second user.

22. A device according to claim 21 wherein the first user and the second user each provide their respective inputs representing approval via a single hardware device.

23. A device according to claim 21 wherein the first user provides the input representing approval by the first user via a first hardware device, wherein the method further includes providing an electronic message to the second user, wherein the second user receives the electronic message and provides the input representing approval by the second user via a second hardware device.

24. A device according to claim 23 wherein the electronic message includes data indicative of the document.

25. A device including:

an ingestion source;

an output configured to enable release of a document to an information system;

a processor;

a memory module containing computer executable code that, when executed via the processor, configured the device to perform a method including:

receiving, from an ingestion source, via an input coupled to the ingestion source, data indicative of a document;

storing the document in a memory location isolated from the information system;

processing the document based on a predefined security protocol thereby to determine an ingestion procedure for the document;

executing the ingestion procedure;

subject to the execution of the ingestion procedure, selectively releasing a modified version of the document to the information system; and obtaining approval from a plurality of users prior to the document being released into the information system;

wherein obtaining approval from a plurality of users prior to the document being released into the information system includes:

(i) a first user, who is electronically authenticated based on authentication data uniquely associated with the first user, providing input representing approval by the first user; and (ii) a second user, who is electronically authenticated based on authentication data uniquely associated with the second user, providing input representing approval by the second user.

26. A device according to claim 25 wherein the first user and the second user each provide their respective inputs representing approval via a single hardware device.

27. A device according to claim 25 wherein the first user provides the input representing approval by the first user via a first hardware device, wherein the method further includes providing an electronic message to the second user, wherein the second user receives the electronic message and provides the input representing approval by the second user via a second hardware device.

28. A device according to claim 27 wherein the electronic message includes data indicative of the document.

* * * * *